(12) United States Patent  
Beard (10) Patent No.: US 7,103,108 B1  
(45) Date of Patent: Sep. 5, 2006

(54) DIGITAL SIGNAL PROCESSOR TRANSCEIVER

(75) Inventor: Paul Beard, Milpitas, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 965 days.

(21) Appl. No.: 10/150,731

(22) Filed: May 17, 2002

Related U.S. Application Data (60) Provisional application No. 60/291,715, filed on May 17, 2001.

(51) Int. Cl.
*H04L 25/49* (2006.01)
*H03K 7/06* (2006.01)

(52) U.S. Cl. ........................... 375/295; 375/303

(58) Field of Classification Search ................ 375/295, 375/296, 302, 303, 305, 316, 329, 332, 334, 375/336, 219, 340; 332/100–105; 711/1–6, 711/100–102, 109, 111
See application file for complete search history.

(56) References Cited

U.S. PATENT DOCUMENTS

| | | | | |
|---|---|---|---|---|
| 3,971,996 A * | 7/1976 | Motley et al. | ............... | 327/233 |
| 4,672,634 A * | 6/1987 | Chung et al. | ............... | 375/303 |
| 4,905,177 A * | 2/1990 | Weaver et al. | ............... | 708/276 |
| 5,140,613 A * | 8/1992 | Birgenheier et al. | ........ | 375/308 |
| 5,225,798 A * | 7/1993 | Hunsinger et al. | .......... | 333/165 |
| 5,274,669 A * | 12/1993 | Klank et al. | ................ | 375/231 |
| 5,285,479 A * | 2/1994 | Iwane | ........................ | 375/298 |
| 5,444,739 A * | 8/1995 | Uesugi et al. | .............. | 375/232 |
| 5,491,446 A * | 2/1996 | Okada et al. | ................ | 327/551 |
| 5,548,253 A * | 8/1996 | Durrant | ...................... | 332/103 |
| 5,802,104 A * | 9/1998 | Thomas | ..................... | 375/222 |
| 5,903,611 A * | 5/1999 | Schnabl et al. | ............. | 375/297 |
| 6,320,914 B1 * | 11/2001 | Dent | .......................... | 375/302 |
| 6,359,936 B1 * | 3/2002 | Shyue | ........................ | 375/295 |
| 6,438,176 B1 * | 8/2002 | Haran et al. | ................ | 375/303 |
| 6,459,742 B1 * | 10/2002 | Marque-Pucheu et al. | .. | 375/308 |
| 6,470,055 B1 * | 10/2002 | Feher | ........................ | 375/259 |
| 6,483,867 B1 * | 11/2002 | Mannermaa | ................ | 375/149 |

\* cited by examiner

*Primary Examiner*—Tesfaldet Bocure
*Assistant Examiner*—Vineeta Panwalkar
(74) *Attorney, Agent, or Firm*—Marger Johnson & McCollom, P.C.

(57) ABSTRACT

A digital signal processor transceiver uses a finite impulse response filter memory to construct a phase integrated angle at each clock cycle. The FIR filter memory is addressed by a multibit pattern and a time count which are used in conjunction to determine the address. Each data word of the FIR filter memory represents the sum of two tap points multiplied by their tap coefficients. Several of the most significant bits of the phase integrated angle are used to address look up tables for the signal's sine and cosine values. The address for the cosine look up table may further be phase compensated. Filter types other than a FIR filter may be used.

36 Claims, 5 Drawing Sheets

DIGITAL SIGNAL PROCESSOR TRANSCEIVER

CROSS REFERENCE TO RELATED APPLICATIONS

This application claims the benefit of U.S. Provisional Application No. 60/291,715, filed May 17, 2001, which is hereby incorporated by reference.

FIELD OF THE INVENTION

The present invention generally relates to the field of wireless data communications and, particularly, to digital signal processor transceiver in a wireless data communications device.

BACKGROUND OF THE INVENTION

Current digital signal processors, as well as other processes and components, in wireless communications devices rely on rechargeable or replaceable batteries for power. Extending the life of the battery is an important goal in the wireless communications industry. Although current devices are designed with power savings as a goal, further improvement in power conservation is an ongoing goal.

Another goal in wireless communications devices is to provide a device which is smaller in size and which provides a relatively great amount of functionality for its size and weight. Smaller and lighter devices place less of a burden on the user who transports them. Although this goal has been recognized in the design of current devices, further improvement also is an ongoing goal.

Therefore, it would be desirable to provide a digital signal processing method and device which uses fewer stages in processing and, thereby, conserves power.

SUMMARY OF THE INVENTION

Accordingly, the present invention is directed to a digital signal processor transceiver which more efficiently processes data to be transmitted from a wireless communications device. This is accomplished through a simple design that incorporates a filter such as a finite impulse response filter, phase integration, phase correction, and trigonometric value look up for sine and cosine values which form the informational signals.

In a first aspect of the present invention, a method of selecting a frequency in a digital signal processor includes the steps of inputting a data bit, determining a plurality of first values associated with the data bit and previously input data bits, successively adding the plurality of first values to a sum, and, on each successive adding of the plurality of first values to the sum, using a portion of the sum to provide an in-phase value and a quadrature value. The portion of the sum may be modified by a phase corrector and the modified sum may then be used to obtain a quadrature value. The method may be implemented in software, hardware, firmware, or a combination of any or all of these techniques.

The present invention offers a digital signal processor transceiver that has a simple and compact design low in cost to manufacture. The present invention requires fewer processing stages than the current devices and uses less power. For instance, current devices often use several stages of adders to provide and sum a tap value; in the present invention, a single stage is used. The present invention may be adapted for increased flexibility to provide for loadable tap points, loadable predistortion data, and loadable phase correction data.

In a particular embodiment, the present invention performs compact processing by using a 24 tap Gaussian finite impulse response filter. The 24 tap FIR filter may be used in a BLUETOOTH communications device in which the bandwidth-time (BT) product is 0.5. An accumulator implements phase integration for frequency modulation. A phase corrector may be used to correct any phase error in the divide by two quad generator employed in using the most significant bits of the accumulated phase angle to determine the in-phase and quadrature values of the information signal. Furthermore, a finite impulse response memory, such as a ROM, may be predistorted to compensate for imperfect integration and sin (x)/x error.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings. The present invention may be implemented as a digital signal processor vector modulator that converts baseband data to a modulated signal, such as a BLUETOOTH Gaussian Frequency Shift Keying (GFSK) modulated signal in which a data bit (or data bits) is represented by a shift in frequency. Other modulation techniques, such as Frequency Shift Keying (FSK) may be used. GFSK passes the baseband data through a Gaussian filter to make the data smoother so to limit its spectral width.

Referring generally now to FIGS. 1 through 5, exemplary embodiments of the present invention are shown.

Figure 1:
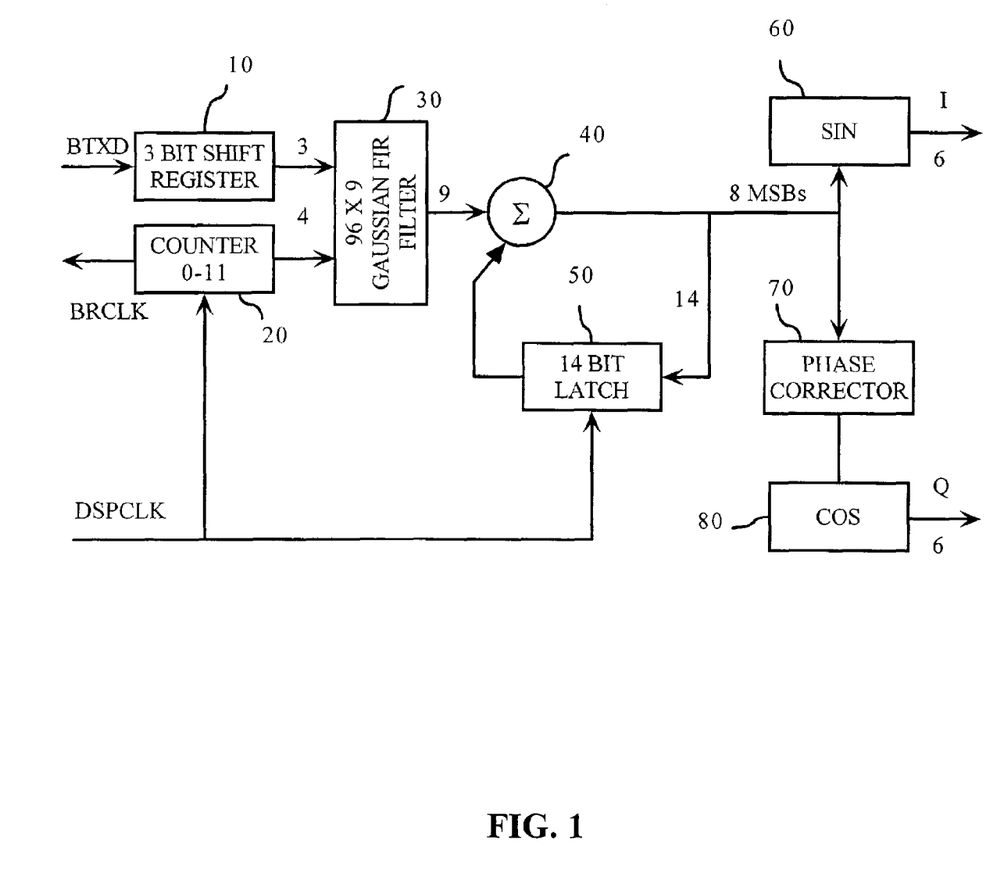
FIG. 1 illustrates a digital signal processor transceiver of the present invention.

FIG. 1 illustrates an embodiment of digital signal processor (DSP) transceiver 100 of the present invention. The DSP transceiver may include a shift register 10, a counter 20, a filter memory 30, an adder 40, a latch 50, a phase corrector 70, a sine memory 60, and a cosine memory 80. A clock signal DSPCLK and a data bit are inputs of the DSP. A sample clock, an in-phase value, and a quadrature value are outputs. The shift register receives a data bit from the radio baseband at the same rate that the counter rolls over. The counter is driven by the clock signal DSPCLK (FIG. 1).

The DSP transceiver filters the baseband data to improve the spectral response of the information transmitted. Finite impulse response (FIR) filters may be used to implement any impulse response of a finite length. The coefficients may be static and may rely on a fixed channel transfer function. The coefficients may be dynamic and may require back channel data to ensure robust operation. Although FIR filters are discussed, the present invention may also be practiced with infinite impulse response (IIR) and other types of filters. Beside Gaussian filters, the present invention may be practiced with Butterworth, Chebyshev, elliptic, Bessel-Thompson, raised-cosine, pole-zero, polynomial, and other filters.

The front end of the DSP transceiver consists of an address generating circuit for data storage retrieval. The address generating circuit may include a delay circuit, a latch, and a counter. In a particular example, as shown in FIG. 1, the delay circuit and the latch are represented by a shift register 10. The three bit pattern of the shift register may serve to tune to a particular frequency (a three bit pattern allows for eight selections). Instead of a three bit pattern, a one bit pattern, a two bit pattern, a four bit pattern, or a pattern of a higher number of bits may be used. With a four bit pattern, sixteen selections are possible. In the particular example, the address of the finite impulse response read only memory (FIR ROM) is made up of the three bits of data from the shift register and four bits from the counter 20. The address generating circuit may be implemented in software or hardware. Software offers greater options in making changes to the process. Hardware provides faster processing. A combination of hardware and software may be used. The counter in this particular embodiment counts from 0 to 11, but may be set to count fewer times or a greater number of times. For instance, the counter may count from 0 to 15 or from 0 to 23. In the particular example of FIG. 1, the FIR ROM is addressed twelve times for every time a bit is shifted into the shift register. When the counter has reached its maximum count value, it may be reinitialized by circuit logic or the like.

An example of the address generating process implemented through software code, using MathCad.C, is provided below to illustrate a particular example of generating the address:

```
Module dsp_tx_sample (
clk,
reset,
btxd,
sample,
);
input clk;
input reset;
input btxd;
output brclk;
output [6:0] sample;
reg [3:0] phase;
reg [2:0] btxd hist;
reg last_btxd;
always @ (posedge elk)
if (reset) begin
last_btxd <=#1 btxd;
btxd_hist <=#1 0;
phase <=#1 0;
end
\\ else if ((last_btxd !=btxd)||(phase ==4'd11)) begin
else if (phase ==4'd11) begin
btxd_hist <=#1 (btxd_hist [1:0], btxd);
last_btxd <=#1 btxd;
phase <=#1 0;
end
else phase <=#1 phase +1;
wire [6:0] sample ={btxd_hist, phase};
wire brclk =(phase ==4'd11);
endmodule
```

The address is used to retrieve stored phase angle values which represent the tap points of a desired filter response. A filter response may be constructed from a number of samples, i.e., the stored phase angle values. The memory may be loadable to permit recalibration of the filter values. This may be needed because of aging of the devices, a change in location of the device, or a change in environment.

In the particular example of FIG. 1, data describing a filter is placed in storage. The storage may be accomplished by a variety of means, including a software routine or a volatile or non-volatile memory. A Gaussian finite impulse response filter offers a symmetrical relationship to reduce the number of process steps per data bit. It also offers flexibility in design and a stable output. Preprocessing of the filter characteristics at a receiver may be used to derive the appropriate FIR filter coefficients which are incorporated in the FIR ROM. The derivation of the FIR filter coefficients may be accomplished by an analysis of the inverse transfer function of the transceiver. Because corresponding coefficients or tap weights are symmetric for a Gaussian type response, each memory word may contain the sum of the products of two tap points and their corresponding coefficients. Thus, the number of computations per data bit may be reduced by half. The embedded coefficients may be determined by a tap weight algorithm and may be updated periodically or as needed to reasonably track changes in the RF propagation characteristics. In particular, a 24 tap Gaussian finite impulse response filter may be used in a BLUETOOTH communications device in which the bandwidth-time (BT) product is 0.5.

Each tap of the filter memory may be integrated using an accumulator to provide a phase angle through phase integration. The accumulator may be an arithmetic logic unit, a software adding routing, etc. Phase integration is useful because it permits a simpler design and superior performance by maintaining the same harmonic structure throughout. The accumulated phase angle ramps up for each successive DSPCLK. In the particular example, one output cycle of the transceiver occurs when the fourteen bit latch rolls over. Fourteen bits are used to provide adequate resolution of the angle. Only the eight most significant bits are actually used to determine the sine and cosine of the accumulated phase angle. The six least significant bits help to maintain overall accuracy in the angle and to provide for the compensation of distortion. The fastest rate that the fourteen bit latch may roll over is slightly more than every 2.7 bits input to the shift register 10. The slowest rate of change for the fourteen bit latch is zero, providing that the FIR ROM repeatedly reads out a zero word for each and every bit pattern and for every time the counter increments. If the bit input rate of the shift register is 1 MHz, then the maximum frequency of the transceiver is slightly under 372 KHz, corresponding to a roll over of the latch value. The present invention is not limited to a fourteen bit representation of the accumulated phase angle. A thirteen bit, a fifteen bit, or other sized latch may be used.

The accumulated phase angle is further processed to define an RF signal represented by the sine value and the cosine value. These component values are usually designated as an in-phase (I) component and a quadrature (Q) component. These components form informational components which modulate the carrier signal.

In the particular example, the eight most significant bits of the integrated phase correspond to an accumulated phase angle. Depending upon the particular requirements of the system, a fewer or greater number of bits may be used. Using fewer bits, such as six or seven, conserves on resources. Using a greater number of bits, such as nine, ten, or sixteen, provides for a higher resolution.

In the particular example, the most significant bits of the accumulated phase angle are further processed for further phase compensation. The processing may be accomplished through dedicated circuitry or through software code. A look up table may be used to provide correction values. The correction values may be loadable to the phase corrector. This permits the user to recalibrate the transceiver as needed. For example, if the user transports the transceiver to another location within a building or outside. In the particular example, the phase correction is performed before the cosine values are determined. This processing may, alternatively, be performed for both sine and cosine processes or solely for the sine determination process.

The sine and cosine of the accumulated phase angle are determined. Their sine and cosine values may be calculated through a software routine, may be determined through hardware computation, may be found through a memory such as a read only memory or an electrically erasable programmable read only memory, may be found through a look up table, etc. The sine value represents the in-phase value of the RF signal and the cosine value represents the quadrature value of the RF signal. In the particular example, the sine and cosine values may be six bit values.

An example of software code for determining the sine and cosine values is provided:

```
\\ This file is generated by math.c
module dsp_sincos_rom (sin_addr, sin, cos_addr, cos);
input [7:0] sin_addr, cos_addr;
output [5:0] sin, cos;
reg [5:0] sin, cos;
always @ (sin_addr) begin
case (sin_addr)
\\256 entries of the form 8'hxx: sin =6'hyy
\\where xx is an 8 bit hex number and yy is a 6 bit hex number
endcase
end
always @ (cos_addr) begin
case (cos_addr)
\\256 entries of the form 8'hxx: cos =6'hyy
\\where xx is an 8 bit hex number and yy is a 6 bit hex number
endcase
end
endmodule
```

The in-phase and quadrature components are further processed to generate the RF signal. They may be immediately converted to analog form by a digital to analog converter.

Figure 2:
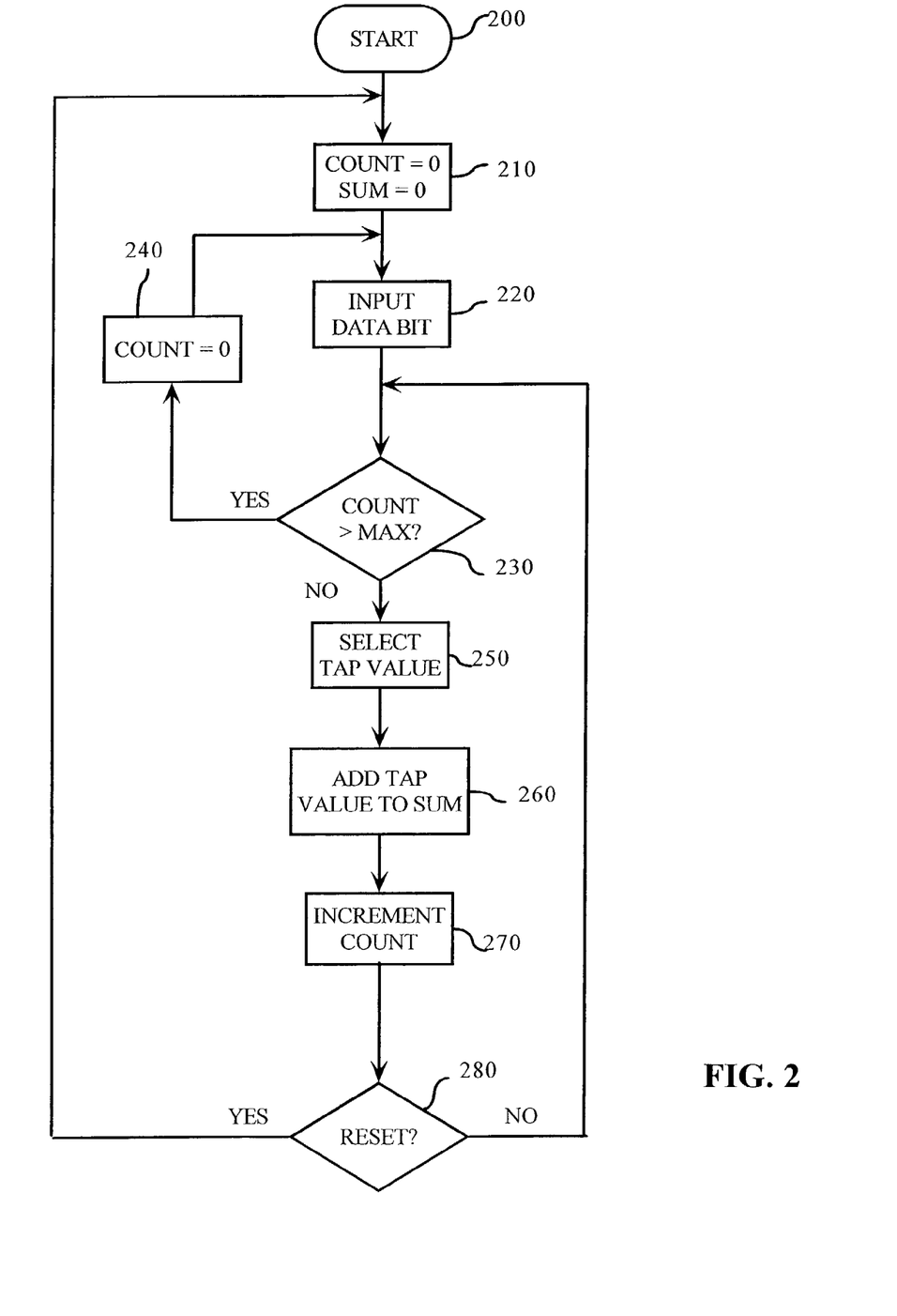
FIG. 2 illustrates a method of the present invention for generating an integrated phase angle.

FIG. 2 illustrates the process steps in determining the accumulated phase angle from the baseband data. A count and a sum are initialized, as per COUNT/SUM step 210. A data bit is input, as per INPUT step 220. As the count is below the maximum value, a tap value is selected from storage in response to the data bit directly or as a pattern of bits which define a storage address, as per SELECT step 250. The tap value is added or accumulated to the sum, as per ADD step 260. The count is incremented, as per RESET step 280. If a reset command has issued, the process returns to INITIALIZATION step 210. Otherwise, the process goes to COUNT/MAX step 230 where a determination is made as to whether the count has exceeded a maximum set value. This maximum set value may be hardwired or may be set through a software or firmware loading operation (or the like). If the count exceed a maximum value, the count is reinitialized 240.

Figure 3:
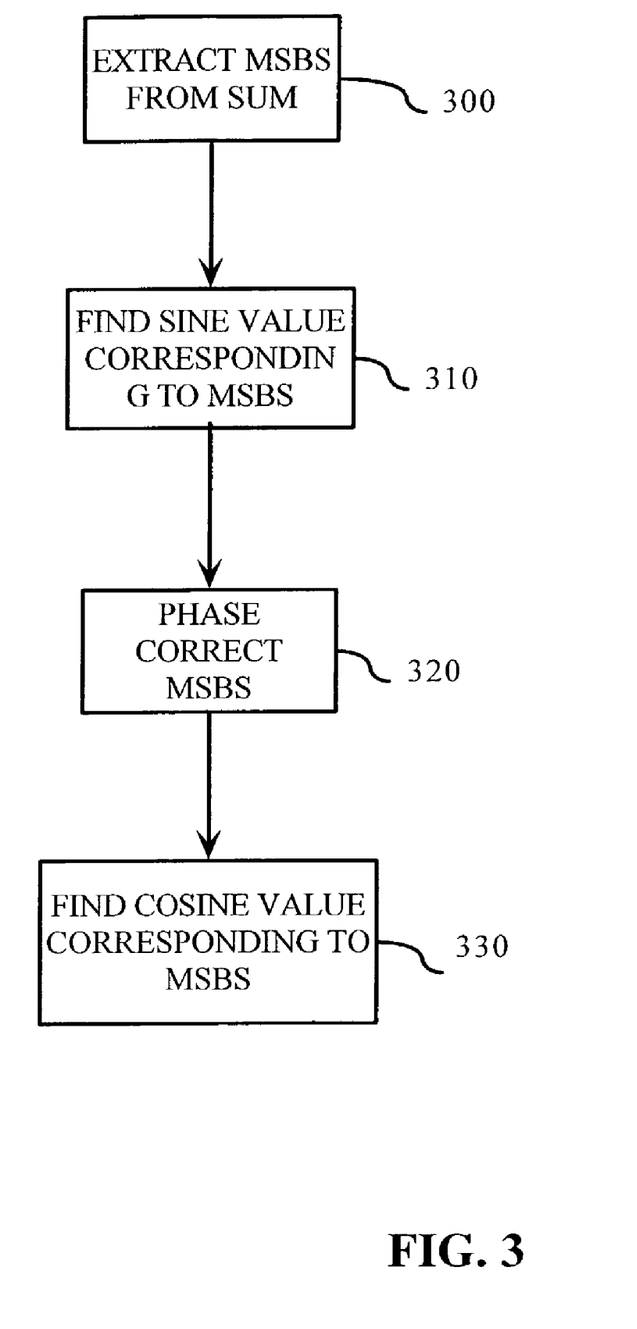
FIG. 3 illustrates a method of the present invention for generating the in-phase and quadrature components of the data signal.

FIG. 3 illustrates the next stage of the process in which the most significant bits of the sum, representing the accumulated phase angle, are used to determine the in-phase and quadrature components of the data signal. The most significant bits are extracted from the sum, as per EXTRACT step 300. This may be achieved through a software masking operation, through a latch, or by simply hardwiring the designated lines to the appropriate circuitry (or the like). The sine value corresponding to the most significant bits, as per FIND step 310, is found. The sine value is the in-phase value of the data signal. The same set of most significant bits may be optionally processed for making a phase correction, as per CORRECT step 320. The phase corrected most significant bits may then be used to determine the cosine value (i.e., the quadrature value).

Figure 4:
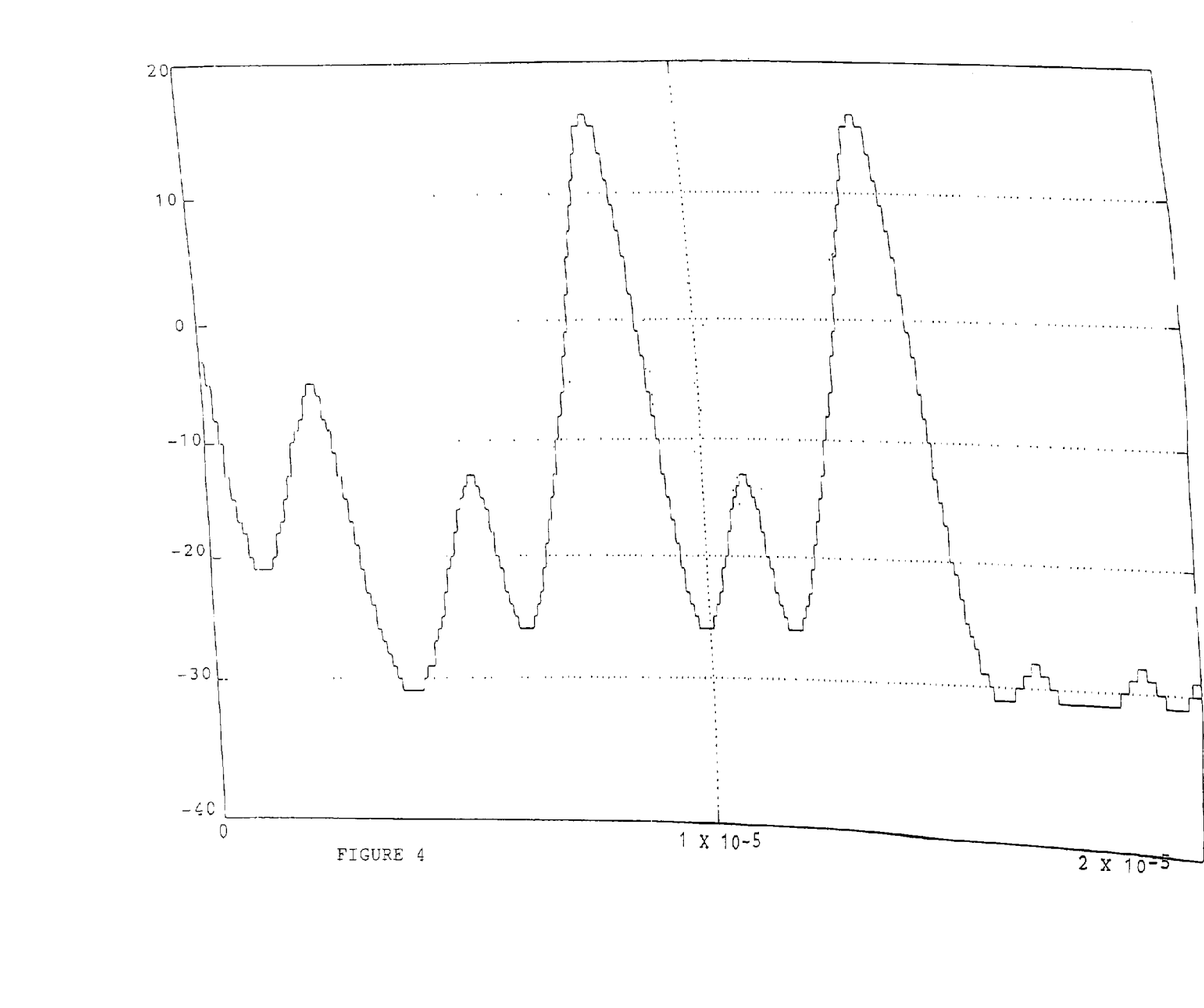
FIG. 4 illustrates an exemplary graph of an output response from the digital signal processor transceiver of the present invention.
Figure 5:
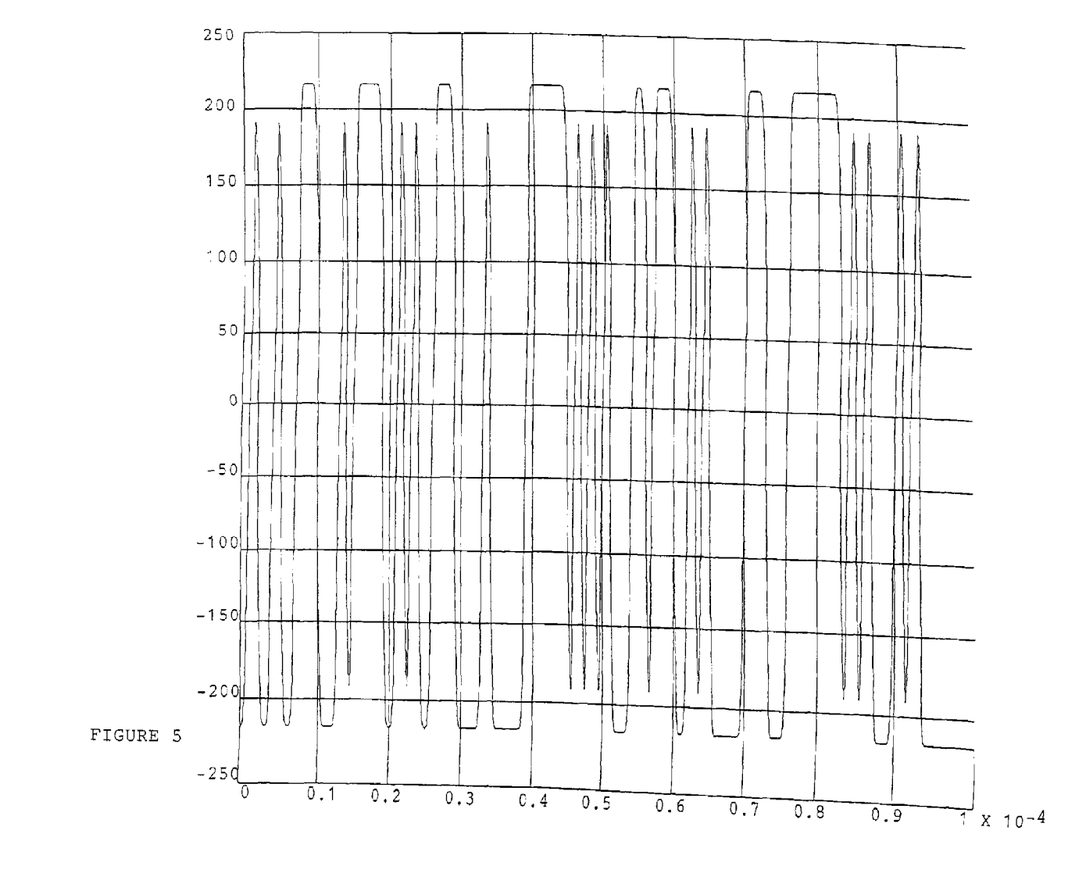
FIG. 5 illustrates an exemplary graph of an output response from the digital signal processor transceiver of the present invention.

FIGS. 4 and 5 illustrate graphs of a sample output from an exemplary DSP transceiver of the present invention.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method of selecting a frequency in a digital signal processor, comprising the steps of:
    inputting a series of data bits;
    combining each data bit with at least one other data bit and with a series of counts from a counter that counts to a particular number, to generate said particular number of addresses for each data bit in said series of data bits;
    using said addresses to determine a plurality of first values associated with each data bit and at least one previously inputted data bit;
    successively adding the first values to a sum; and
    on each successive adding of the first values of the sum, using at least a portion of the sum to provide an in-phase value and a quadrature value such that a phase integrated angle at each clock cycle may be produced.

2. The method of claim 1, wherein at least a portion of the sum addresses a first memory which contains an in-phase value and a second memory which contains a quadrature value.

3. The method of claim 2, wherein the first memory contains sine values and the second memory contains cosine values.

4. The method of claim 1, wherein the series of input data bits are output by a baseband signal.

5. The method of claim 1, wherein said plurality of said data bits are three in number.

6. The method of claim 5, wherein said plurality of first values are stored in a Gaussian finite impulse response memory.

7. The method of claim 6, wherein said Gaussian finite impulse response memory is a read only memory.

8. The method of claim 1, wherein said sum is stored in a latch.

9. The method of claim 1, wherein the count from a said counter and a data bit and at least one previously input data bit form the complete address to access one of the plurality of first values.

10. A method of selecting a frequency in a digital signal processor, comprising the steps of:
inputting a series of data bits;
combining a plurality of said data bits with a series of counts from a counter that counts to a particular number, to generate said particular number of addresses for each bit in said series of inputted bits;
using said addresses to determine a series of values from one or more taps in a finite impulse response filter in which each value of the series is individually and successively added to a sum;
using at least a portion of the sum to determine an in-phase value and a quadrature value.

11. The method of claim 10, wherein said series of data bits is from a baseband, time delayed with respect to one another.

12. The method of claim 11, wherein each of said values of said series of values represents an addition of two products of a single tap and its corresponding coefficient.

13. The method of claim 10, wherein each of said series of values is determined by a pattern of bits including a recently inputted bit.

14. The method of claim 13, wherein said pattern of bits is formed of multiple bits, including the recently input bit.

15. A method for selecting a frequency in a digital signal processor, comprising the steps of:
inputting a series of bits;
clocking a counter to yield a count value; and
using a plurality of said bits and each count value of said counter as an address to determine a plurality of filter values for each bit in said series of bits.

16. The method of claim 15, further comprising phase integrating a plurality of said filter values to yield a sum.

17. The method of claim 16, wherein said filter values represents multiple taps of the filter.

18. The method of claim 17, further comprising using most significant bits of said sum to derive a sine value.

19. A method for selecting a frequency in a digital signal processor, comprising the steps of:
inputting a series of bits;
clocking a counter to yield a count value;
using a plurality of said bits and the count value as an address to determine a plurality of filter values for each bit in said series, said filter values representing multiple taps of the filter; and
using the most significant bits of said sum to derive a sine value, and further comprising using a phase correction process on the most significant bits and using a resulting output of the phase correction process to derive a cosine value.

20. The method of claim 19, wherein the said sine value is an in-phase value and the cosine value is a quadrature value.

21. A digital signal processor transceiver, comprising:
inputting a series of data bits;
combining each data bit with at least one other data bit and with a series of counts from a counter that counts to a particular number to generate a series of addresses having said particular number of addresses for each data bit,
means using said addresses for selecting a value representing two or more taps of a filter;
means for phase integrating the value to provide a sum; and
means for using a portion of the sum to determine an in-phase value and a quadrature value.

22. The digital signal processor transceiver of claim 21, wherein the means for using the sum includes a means for phase angle correction.

23. The digital signal processor transceiver of claim 21, wherein the means for selecting a value includes a means for storing a bit pattern from a baseband.

24. The digital signal processor transceiver of claim 23, wherein the means for selecting a value further includes a means for counting.

25. The digital signal processor transceiver of claim 21, wherein the means for selecting a value includes means for storing and means for generating an address in which the address is used to retrieve the tap points of a desired filter response from the means for storing.

26. The digital signal processor transceiver of claim 25, wherein the means for storing being loadable to permit recalibration of the tap points of the desired filter response.

27. The digital signal processor transceiver of claim 25, wherein the desired filter response being a Gaussian finite impulse response (FIR) filter.

28. The digital signal processor transceiver of claim 27, wherein coefficients of the Gaussian FIR filter are derived through preprocessing of the filter characteristics at a receiver by an analysis of an inverse transfer function of the transceiver.

29. The digital signal processor transceiver of claim 27, wherein each word of the means for storing corresponding to the sum of the products of two tap points and their corresponding coefficients.

30. The digital signal processor transceiver of claim 29, wherein the coefficients being determined by a tap weight algorithm and being updated either periodically or as needed to reasonably track changes in the RF propagation characteristics.

31. The digital signal processor transceiver of claim 30, wherein the Gaussian FIR filter having 24 taps and the transceiver being part of a BLUETOOTH communications device in which the bandwidth-time (BT) product is 0.5.

32. The digital signal processor transceiver of claim 31, wherein each word of the means for storing providing an integrated phase angle.

33. The digital signal processor transceiver of claim 21, wherein the means for using a portion of the sum includes a means for determining sine and cosine values for an accumulated phase angle.

34. The digital signal processor of claim 33, wherein the means for determining sine and cosine values includes software routine, hardware, memory, and a look up table.

35. A digital signal processor transceiver, comprising:
a latch for an address which includes data bits from a baseband and a count value from a counter,
a first memory for providing an angle value corresponding to said address,
an adder for phase integrating said angle value to form a sum, and
a second memory containing sine values, a phase corrector, and a third memory contain cosine values, wherein the most significant bits from the sum address the second memory and are modified to provide an address for the third memory.

36. The digital signal processor transceiver of claim 35, wherein said first memory is a Gaussian finite impulse response read only memory, said second memory is a look up table, and said third memory is a look up table.

* * * * *